(12) United States Patent
Konopka et al.

(10) Patent No.: US 6,630,533 B2
(45) Date of Patent: Oct. 7, 2003

(54) EXTERIOR FINISHING COMPOSITION

(75) Inventors: Kenneth Michael Konopka, Horsham, PA (US); Michael Joseph O'Brien, Doylestown, PA (US); Alan Wayne Kohr, Schwenksville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 0 days.

(21) Appl. No.: 09/933,405

(22) Filed: Aug. 20, 2001

(65) Prior Publication Data

US 2002/0049272 A1 Apr. 25, 2002

Related U.S. Application Data

(60) Provisional application No. 60/227,481, filed on Aug. 24, 2000.

(51) Int. Cl.$^7$ .................................................. C08K 3/34
(52) U.S. Cl. ........................ 524/560; 524/561; 524/558; 524/523; 524/577; 524/555; 525/221; 525/227; 525/228; 427/388.4; 427/393.4; 427/393.5; 427/133
(58) Field of Search ................................ 524/560, 561, 524/558, 523, 577, 555, 831, 833; 525/221, 227, 228; 427/388.4, 393.4, 393.5, 133

(56) References Cited

U.S. PATENT DOCUMENTS

| 4,762,867 A | | 8/1988 | Flodin et al. |
| 4,859,723 A | * | 8/1989 | Kyminas et al. ............... 524/31 |
| 5,202,378 A | | 4/1993 | Barnett |
| 5,516,865 A | | 5/1996 | Urguiola |
| 5,521,266 A | | 5/1996 | Lau |
| 6,040,409 A | | 3/2000 | Lau et al. |
| 6,235,814 B1 | * | 5/2001 | Bowe ............................ 524/5 |

FOREIGN PATENT DOCUMENTS

| EP | 0960919 A1 | 12/1999 |
| EP | 1004554 A2 | 5/2000 |
| EP | 1048676 A2 | 11/2000 |

* cited by examiner

*Primary Examiner*—David W. Wu
*Assistant Examiner*—Satya Sastri
(74) *Attorney, Agent, or Firm*—Gary D. Greenblatt

(57) ABSTRACT

An exterior finishing composition is provided containing a polymer which includes hydrophobic monomers as polymerized units, and a rheology modifier. The exterior finishing composition is useful as a basecoat and as a topcoat in multilayered exterior wall systems. Also provided is a method of coating a vertical surface with the exterior finishing composition.

9 Claims, No Drawings

EXTERIOR FINISHING COMPOSITION

CROSS REFERENCE TO RELATED PATENT APPLICATIONS

This is a non-provisional application of prior pending U.S. provisional application Ser. No. 60/227,481 filed Aug. 24, 2000.

This invention relates to an exterior finishing composition. In particular, this invention relates to an exterior finishing composition which includes polymers containing hydrophobic monomers as polymerized units and to a method of using the exterior finishing composition.

Multilayered exterior wall systems such as exterior insulation and finish systems (EIFS) are used extensively as the exterior wall surface of commercial and residential buildings. These systems, which include a substrate covered by one or more exterior finishing compositions, provide walls which are insulated and resistant to moisture. The multilayered exterior wall system may be prepared by covering a substrate such as plywood or gypsum board with a layer of insulation board, covering the insulation board with a layer of basecoat embedded with a reinforcing mesh, and finishing with a topcoat. In contrast to other surface finishes such as paints, exterior finishing compositions such as EIFS basecoats and topcoats are typically applied with a trowel to form a layer with a thickness from 0.1 to 2.5 cm.

The exterior finishing composition must provide basecoat or topcoat layers which are protective and, for a topcoat, is also decorative. The layer formed from the exterior finishing composition must be resistant to moisture, flexible in response to temperature changes, and resistant to the pickup of dirt. Typical exterior finishing compositions contain polymer, filler such as clay or calcium carbonate, and aggregate such as sand to provide surface texture. Polymers containing hydrophobic monomers as polymerized units are known in the art to provide coatings with improved resistance to moisture. In EP1,004,554 A2, a masonry composition is disclosed which contains masonry and a polymer containing as polymerized units 20 to 100 parts by weight of at least one $C_{12}$ to $C_{40}$ alkyl ester of (meth)acrylic acid. The polymer may be admixed with masonry, applied onto masonry in a cement containing slurry coat, or coated onto masonry with a wet thickness of 15 to 150 microns. EP1,004,554 A2 discloses that the use of a polymer containing from 20 to 100% by weight of a hydrophobic monomer as a masonry modifier was found to increase the water resistance and the flexural strength of the masonry. However, the masonry compositions disclosed in EP1,004,554 A2 do not have sufficient resistance to sagging when applied as thick layers onto vertical surfaces and therefore, are unsuitable as exterior finishing compositions such as basecoats or topcoats in multilayered exterior wall systems. Exterior finishing compositions with water resistance and suitable resistance to sag to allow application onto vertical surfaces are desired.

In the present invention, an exterior finishing composition is provided with improved water resistance as measured by resistance to water whitening, improved drying at low temperature, high humidity conditions, resistance to dirt pickup, and suitable resistance to sag to allow application onto vertical surfaces. The exterior finishing composition includes a polymer containing hydrophobic monomers as polymerized units and a rheology modifier to provide the necessary rheology to the exterior finish composition to allow the application of a thick layer onto a vertical surface without sagging prior to set up and drying of the exterior finish composition.

In the first aspect of this invention, an exterior finishing composition is provided including from 3 to 65 weight % based on weight of the exterior finishing composition of a polymer containing as polymerized units: from 20 to 100 parts by weight of the polymer of at least one $C_{12}$ to $C_{40}$ alkyl ester of (meth)acrylic acid, from 0 to 80 parts by weight of the polymer of at least one ethylenically unsaturated monomer, and from 0 to 10 parts by weight of the polymer of at least one ethylenically unsaturated acid containing monomer or salts thereof; from 0.06 to 3.0 weight % of at least one rheology modifier, based on weight of the exterior finishing composition; from 10 to 55 weight % water, based on weight of the exterior finishing composition; from 0 to 30 weight % of at least one filler, based on weight of the exterior finishing composition; and from 0 to 80 weight % of at least one aggregate, based on weight of the exterior finishing composition, wherein the exterior finishing composition contains at least 2 weight % filler and aggregate, based on weight of the exterior finishing composition.

In the second aspect of this invention, an exterior finishing composition is provided including 5 to 65 weight % polymer, wherein the polymer contains as polymerized units from 20 to 100 parts by weight of the polymer of at least one $C_{12}$ to $C_{40}$ alkyl ester of (meth)acrylic acid, from 0 to 80 parts by weight of the polymer of at least one ethylenically unsaturated monomer, and from 0 to 10 parts by weight of the polymer of at least one ethylenically unsaturated acid containing monomer or salts thereof; from 0.1 to 3.0 weight % of at least one rheology modifier, based on weight of the exterior finishing composition; and from 30 to 55 weight % water, based on weight of the exterior finishing composition.

In a third aspect of this invention, a method of coating an exterior vertical surface is provided including the steps of applying on the exterior vertical surface, an exterior finishing composition containing 3 to 65 weight % based on weight of the exterior finishing composition of a polymer containing as polymerized units: from 20 to 100 parts by weight of the polymer of at least one $C_{12}$ to $C_{40}$ alkyl ester of (meth)acrylic acid, from 0 to 80 parts by weight of the polymer of at least one ethylenically unsaturated monomer, and from 0 to 10 parts by weight of the polymer of at least one ethylenically unsaturated acid containing monomer or salts thereof; from 0.06 to 3.0 weight % of at least one rheology modifier, based on weight of the exterior finishing composition; from 10 to 55 weight % water, based on weight of the exterior finishing composition; from 0 to 30 weight % of at least one filler, based on weight of the exterior finishing composition; and from 0 to 80 weight % of at least one aggregate, based on weight of the exterior finishing composition, wherein the exterior finishing composition contains at least 2 weight % filler and aggregate, based on weight of the exterior finishing composition; and drying or allowing to dry the exterior finishing composition.

As used herein, the term "(meth)acrylate" refers to either acrylate or methacrylate and the term "(meth)acrylic" refers to either acrylic or methacrylic. As used herein, the term "hydrophobic monomer" refers to a $C_{12}$ to $C_{40}$ alkyl ester of (meth)acrylic acid.

The present invention provides an exterior finishing composition containing a polymer, at least one rheology modifier, water, optionally at least one filler, and optionally at least one aggregate.

The polymer contains as polymerized units from 20 to 100 parts by weight, preferably from 35 to 100 parts by weight, and more preferably from 50 to 100 parts by weight of at least one $C_{12}$ to $C_{40}$ alkyl ester of (meth)acrylic acid. It is further preferred that the polymer used in this invention contains as polymerized units from 40 to 96 parts by weight, more preferably 40 to 93 parts by weight of at least one $C_{12}$ to $C_{40}$ alkyl ester of (meth)acrylic acid. It is preferred that the alkyl ester of (meth)acrylic acid be a $C_{16}$ to $C_{18}$ alkyl ester of (meth)acrylic acid. Suitable alkyl esters of (meth) acrylic acid include cetyl (meth)acrylate, stearyl (meth) acrylate, behenyl (meth)acrylate, and eicosyl (meth) acrylate. Beneficial properties may be obtained by utilizing more than one $C_{12}$ to $C_{40}$ alkyl ester of (meth)acrylic acid.

The polymer used in this invention may also contain as polymerized units from 0 to 80 parts by weight, preferably from 0 to 50 parts by weight, and more preferably 1 to 20 parts by weight of at least one ethylenically unsaturated monomer wherein the ethylenically unsaturated monomer is not a $C_{12}$ to $C_{40}$ alkyl ester of (meth)acrylic acid. Suitable ethylenically unsaturated monomers for use in the preparation of the polymer compositions of this invention include, but are not limited to (meth)acrylic ester monomers including methyl acrylate, ethyl acrylate, butyl acrylate, 2-ethylhexyl acrylate, decyl acrylate, methyl methacrylate, and butyl methacrylate; hydroxyalkyl esters of (meth)acrylic acid such as hydroxyethyl (meth)acrylate and hydroxypropyl (meth)acrylate; acrylamide or substituted acrylamides; styrene or substituted styrene; vinyl acetate or other vinyl esters; vinyl monomers such as vinyl chloride, vinylidene chloride, N-vinyl pyrrolidone; and (meth)acrylonitrile. Other suitable ethylenically unsaturated monomers include $C_6$ to $C_{20}$ alkyl styrene and alkyl-α-methyl styrene, $C_6$ to $C_{20}$ alkyl dialkyl itaconate, $C_{10}$ to $C_{20}$ vinyl esters of carboxylic acids, $C_8$ to $C_{20}$ N-alkyl acrylamide and methacrylamide, $C_{10}$ to $C_{20}$ alkyl α-hydroxymethylacrylate, $C_8$ to $C_{20}$ dialkyl 2,2'-(oxydimethylene) diacrylate, $C_8$ to $C_{20}$ dialkyl 2,2'-(alkyliminodimethylene)diacrylate, $C_8$ to $C_{20}$ N-alkylacrylimide, and $C_{10}$ to $C_{20}$ alkyl vinylether. Butyl acrylate, methyl methacrylate, and styrene are preferred. Most preferred are butyl acrylate and methyl methacrylate.

Other suitable ethylenically unsaturated monomers include fluorinated monomers such as 0 to 80 parts by weight, preferably 0 to 50 parts by weight, most preferably 1 to 15 parts by weight of a fluorinated (meth)acrylate ethylenically unsaturated monomer, such as Zonyl™ (Trademark of DuPont Chemical Company) products and silicone containing monomers such as 0 to 80 parts by weight, preferably 0 to 50 parts by weight, more preferably 1 to 15 parts by weight of a silicone containing ethylenically unsaturated monomer, such as vinyl trimethoxy silane and methacryloxy propyl trimethoxy silane. Further other suitable ethylenically unsaturated monomers include cross-linking monomers. Cross-linking monomers include multi-ethylenically unsaturated monomers and "latent" crosslinkers such as acetoacetate-functional monomers such as acetoacetoxyethyl acrylate, acetoacetoxypropyl methacrylate, acetoacetoxyethyl methacrylate, allyl acetoacetate, acetoacetoxybutyl methacrylate, and 2,3-di (acetoacetoxy)propyl methacrylate; divinyl benzene, (meth) acryloyl polyesters of polyhydroxylated compounds, divinyl esters of polycarboxylic acids, diallyl esters of polycarboxylic acids, diallyl dimethyl ammonium chloride, triallyl terephthalate, methylene bis acrylamide, diallyl maleate, diallyl fumarate, hexamethylene bis maleamide, triallyl phosphate, trivinyl trimellitate, divinyl adipate, glyceryl trimethacrylate, diallyl succinate, divinyl ether, the divinyl ethers of ethylene glycol or diethylene glycol diacrylate, polyethylene glycol diacrylates of methacrylates, 1,6-hexanediol diacrylate, pentaerythritol triacrylate or tetraacrylate, neopentyl glycol diacrylate, allyl methacrylate, cyclopentadiene diacrylate, the butylene glycol diacrylates or dimethacrylates, trimethylolpropane di- or tri-acrylates, (meth)acrylamide, n-methylol (meth) acrylamide and mixtures thereof. The amount of cross-linking monomer utilized may range from 0 to 10 weight %, preferably from 0.1 to 5 weight %, and is chosen such that the cross-linking monomer does not interfere with film formation.

The polymer used in this invention may also contain as polymerized units from 0 to 10 parts by weight, preferably 1 to 5 parts by weight, more preferably 1 to 3 parts by weight ethylenically unsaturated acid containing monomer or salts thereof. Suitable ethylenically unsaturated acid containing monomers include, but are not limited to acrylic acid, methacrylic acid, crotonic acid, phosphoethyl methacrylate, 2-acrylamido-2-methyl-1-propanesulfonic acid, sodium vinyl sulfonate, itaconic acid, fumaric acid, maleic acid, monomethyl itaconate, monomethyl fumarate, monobutyl fumarate, and maleic anhydride. Acrylic acid and methacrylic acid are preferred. Methacrylic acid is more preferred.

Chain transfer agents may be used to control the molecular weight of the polymer used in this invention. Suitable chain transfer agents include mercaptans, such as, for example, dodecylmercaptan. The chain transfer agent may be used at from 0% to 10%, preferably from 0.1 to 5%, based on the total weight of the polymeric composition.

The polymer used in this invention may be prepared by a single stage or a multi-stage polymerization process. In a polymerization process involving more than one stage, the composition ranges described herein referred to weight based on the total weight of polymer. The polymerization process may be emulsion polymerization. See U.S. Pat. No. 5,521,266 for a detailed description of emulsion polymerization processes. The polymerization process may also be solution polymerization followed by emulsification and may involve solvent removal step. See U.S. Pat. No. 5,539,021 for detailed descriptions of a solution polymerization followed by mini-emulsion polymerization or micro-emulsion polymerizations. A preferred process is emulsion polymerization in the presence of a macromolecular organic compound having a hydrophobic cavity as disclosed in U.S. Pat. No. 5,521,266. Suitable macromolecular organic compounds include cyclodextrin, cyclodextrin derivatives, cycloinulohexose, cycloinuloheptose, cycloinulocotose, calyxarene, and cavitand. Cyclodextrin includes α-cyclodextrin, β-cyclodextrin, and γ-cyclodextrin. Cyclodextrin derivatives include the methyl, triacetyl, hydroxypropyl, and hydroxyethyl derivatives of α-cyclodextrin, β-cyclodextrin, and γ-cyclodextrin. The amount of macromolecular organic compound having a hydrophobic cavity used in the process disclosed in U.S. Pat. No. 5,521,266 is typically from 0.1 to 50 weight percent, preferably 0.1 to 30 weight percent, and more preferably 0.5 to 10 weight percent based on the total weight of ethylenically unsaturated monomers. The polymer may also be prepared by emulsion polymerization in the presence of a non-cyclical polysaccharide capable of forming an inclusion compound, as disclosed in WO 98/24821 A2. Suitable non-cyclical polysaccharides include both unmodified polysaccharides and modified polysaccharides which are partially or totally derivatized on the hydroxyl groups.

The emulsion polymer process to prepare the polymer may also include various synthesis adjuvants known in the art. The monomer mixture containing the hydrophobic monomer may be emulsified with an anionic or nonionic surfactant or dispersing agent, or compatible mixtures thereof such as a mixture of an anionic and nonionic surfactant. Suitable levels range from 0.05% to 5% by weight of surfactant or dispersing agent based on the weight of the monomer mixture.

Suitable anionic dispersing agents include, for example, alkali fatty alcohol sulfates, such as sodium lauryl sulfate; arylalkyl sulfonates, such as potassium isopropylbenzene sulfonate; alkali alkyl sulfosuccinates, such as potassium isopropylbenzene sulfonate; alkali alkyl sulfosuccinates, such as sodium octyl sulfosuccinate; and alkali arylalkylpolyethoxyethanol sulfates or sulfonates, such as sodium t-octylphenoxypolyethoxyethyl sulfate, having 1 to 5 oxyethylene units.

Suitable nonionic dispersing agents include, for examples, alkyl phenoxypolyethoxy ethanols, having alkyl groups of from 7 to 18 carbon atoms and from 6 to 60 oxyethylene units such as, for example, heptyl phenoxypolyethoxyethanols; ethylene oxide derivatives of long chained carboxylic acids such as lauric acid, myristic acid, palmitic acid, oleic acid, or mixtures of acids such as those found in tall oil containing from 6 to 60 oxyethylene units; ethylene oxide condensates of long chained alcohols such as octyl, decyl, lauryl, or cetyl alcohols containing from 6 to 60 oxyethylene units; ethylene oxide condensates of long-chain or branched chain amines such as dodecyl amine, hexadecyl amine, and octadecyl amine, containing from 6 to 60 oxyethylene units; and block copolymers of ethylene oxide sections combined with one or more hydrophobic propylene oxide sections.

Polymers such as hydroxyethyl cellulose, methyl cellulose, polyacrylic acid, polyvinyl alcohol, may be used as emulsion stabilizers and protective colloids, as is known in the art.

The emulsion polymerization process to prepare the polymer may be initiated by thermal decomposition of free radical precursors which are capable of generating radicals suitable for initiating addition polymerization such as, for example, ammonium or potassium persulfate. Radicals suitable for initiating addition polymerization may also be generated by using free radical precursors as the oxidizing component of a redox system, which also includes a reducing component such as potassium metabisulfite, sodium thiosulfate, or sodium formaldehyde sulfoxylate. The free radical precursor and reducing agent together, referred to as a redox system herein, may be used at a level of from about 0.001% to 5%, based on the weight of ethylenically unsaturated monomers used. Examples of redox systems include t-butyl hydroperoxide/sodium formaldehyde sulfoxylate/Fe (III) and ammonium persulfate/sodium bisulfite/sodium hydrosulfite/Fe(III). The polymerization temperature may be from 20° C. to 95° C.

In the process utilized for preparing the samples within this application, a first stage was prepared by adding a monomer emulsion and sodium persulfate to a solution containing methyl-β-cyclodextrin ("CD"), deionized water, and surfactant. The first stage was reacted at 85° C. A second stage was prepared by making a second monomer emulsion and feeding the second monomer emulsion and a sodium persulfate solution to the reacted first stage. The second stage was reacted at 85° C.

The polymers may have a weight average molecule weight in the range of 50,000 to greater than 2,000,000 as measured by gel permeation chromatography using tetrahydrofuran solvent. The measurements are based on a polymethylmethacrylate equivalent. A preferred weight average molecular weight range for the polymer is 100,000 to 1,000,000.

The polymer may be a particle dispersion in a liquid medium. Preferably the polymer is a particle dispersion in an aqueous medium. The average diameter of the polymer particle in the particle dispersion may be in the range of 50 nm to 1,000 nm, preferably in the range of 70 nm to 600 nm, and more preferably in the range of 90 nm to 300 nm. The particle dispersion may have an unimodal particle size distribution, or may have a multimodal particle size distribution such as a bimodal distribution.

The exterior finishing composition also includes at least one rheology modifier, also referred to as a thickener, to modify the flow characteristics, as represented by the viscosity, of the exterior finishing composition. The rheology modifier increases the viscosity of the exterior finishing composition to provide a consistency which allows the application of a single thick film or multiple applications to buildup a thick film on a vertical surface. The rheology modifier prevents sagging of the thick film of the exterior finishing composition on a vertical surface prior to set up or drying. The rheology modifier may be added to the exterior finishing composition to obtain a viscosity in the range of 50 to 200 Paste Units, as measured by a Brookfield KU-1+ viscometer (Brookfield Engineering Co.) equipped with a KU1-75Y paste spindle. A preferred viscosity range is 90 to 140 Paste Units. The rheology modifier may be added at levels in the range of 0.06 to 3.0 weight %, preferably in the range of 0.1 to 1.0 weight, based on the weight of the exterior finishing composition. Suitable rheology modifiers include alkali soluble emulsions, hydrophobically modified alkali soluble emulsions, alginates, hydroxyethyl cellulose, hydrophobically modified hydroxyethyl cellulose, hydrophobically modified polyurethanes, acrylamides, and hydrophobically modified polyacrylamides. Preferred rheology modifiers include alkali soluble emulsions, hydrophobically modified alkali soluble emulsions, and hydroxyethyl cellulose. Preferably, the alkali soluble emulsions have a weight average molecular weight greater than 500,000, more preferably above 750,000.

The exterior finishing composition also contains from 10 to 55 weight % water, based on weight of the exterior finishing composition. The exterior finishing composition may also contain low levels of solvents including odorless mineral spirits and coalescents. In a preferred embodiment, the level of solvents is less than 5 weight % and more preferably less than 2 weight %, based on the weight of the exterior finishing composition. In a most preferred embodiment, the exterior finishing composition is an aqueous composition which does not contain solvents.

The exterior finishing composition may optionally include fillers which are defined herein as solid mineral containing materials with average particle diameters of less than 12 μm. Fillers may be added to lower the cost or to provide opacity to the exterior finishing composition. The exterior finishing composition of this invention may contain from 0 to 30 weight % of at least one filler, preferably from 2 to 25 weight % of at least one filler, and more preferably from 4 to 15 weight % of at least one filler, based on the weight of the exterior finishing composition. Suitable fillers, also referred to as extenders, include clay, calcium carbonate, titanium dioxide, mica, silicon dioxide such as silica flour, and wollastonite. Preferred fillers are clay, calcium carbonate, and titanium dioxide. In a preferred embodiment of this invention, the exterior finishing composition contains 4 to 15 weight % of clay, calcium carbonate, titanium dioxide, or mixtures thereof, based on the weight of the exterior finishing composition.

The exterior finishing composition may contain from 0 to 70 weight % of at least one aggregate, preferably from 40 to 65 weight % of at least one aggregate, based on the weight of the exterior finishing composition. As used herein, "aggregates" refer to solid mineral containing materials with average particle diameters of 12 μm or greater. Aggregates are solid particles which may impart surface texture to the dried layer of the exterior finishing composition. Further, the size of the aggregate may be used to determine the minimum applied thickness of the exterior finishing composition, especially for application by trowel. Suitable aggregates include sand and stone chips such as marble chips and granite chips.

The exterior finishing composition of this invention may contain other components such as emulsifiers; dispersants; curing agents such as organosilanes, epoxies, and isocyanates; coalescents such as 2,2,4 trimethyl 1,3 pentanediol monoisobutyrate; wetting agents such as ethylene glycol, propylene glycol, and dipropylene glycol; preservatives such as biocides and mildewcides; plasticizers; fibers such as polyethylene fiber, wollastonite, cellulose fiber, and glass fiber; bases such as sodium hydroxide, potassium hydroxide, 2-methyl-1-propanol, and ammonia; anti-foaming agents; and colorants such as solid iron oxide and carbon black, universal water based colorants, and dyes.

The solids level of the nonvolatile components of the exterior finishing composition may be in the range of 5 to 90 weight %, preferably in the range of 30 to 90%, based on the weight of the exterior finishing composition. In a preferred embodiment, the solids level is in the range of 60 to 85 weight % based on the weight of the exterior finishing composition.

Cement is a calcium silicate containing material which reacts with water and hardens to produce a water-insoluble material. Examples of cement include the various types of Portland cement. In one embodiment, the exterior finishing composition has substantially no cement. As used herein, the term "substantially no cement" means less than 5 weight % cement, preferably less than 2 weight %, and more preferably less than 1%, based on the total weight of the exterior finishing composition.

The exterior finishing composition is suitable as a basecoat formulation used in EIFS and other finishing systems which may be applied onto an insulated substrate such as polystyrene or polyurethane boards. A reinforcing mesh such as a metal, fiberglass, or polypropylene mesh may be attached to the insulated substrate and the basecoat formulation is applied onto the reinforcing mesh covered substrate. Alternatively, the basecoat formulation may be applied onto an insulated substrate and then the reinforcing mesh may be embedded into the basecoat formulation. In one embodiment, the basecoat formulation does not contain cement and is referred to herein as "noncementitious". This noncementitious basecoat formulation may contain from 5 to 10 weight % polymer, preferably from 8 to 10 weight % polymer; from 0.06 to 1.0 weight % rheology modifier; from 10 to 20 weight % water, preferably from 12 to 16 weight % water; from 50 to 65 weight % aggregate, preferably from 54 to 59 weight % aggregate, based on the weight of the noncementitious basecoat. Further, the noncementitious basecoat formulation may also contain from 10 to 20 weight % silica flour, from 0 to 3 weight % mica, from 0 to 1.5 weight % pigment, from 0.11 to 0.15 weight % defoamer, from 0.09 to 0.12 weight % preservative, from 0.2 to 0.8 weight % coalescent, from 0 to 0.07 weight % base, from 0 to 0.1 weight % ethylene glycol, and from 0 to 0.2 weight % fibers, based on the total weight of the non-cementitious basecoat formulation. In a second embodiment, the basecoat formulation is a cementitious basecoat formulation. The cementitious basecoat formulation may contain from 3 to 10 weight % polymer, preferably from 8 to 12 weight % polymer; from 0.06 to 1.0 weight % rheology modifier; from 10 to 30 weight % water, preferably from 15 to 25 weight % water; from 0 to 5 weight % filler; from 25 to 45 weight % aggregate, preferably from 20 to 40 weight % aggregate; and from 33 to 50 weight % cement, based on the total weight of the cementitious basecoat formulation. The cementitious basecoat formulation may further contain from 0 to 0.45 weight % coalescent, preferably from 0 to 0.2 weight % coalescent; from 0 to 0.2 weight % defoamer; and from 0 to 0.18 weight % preservative, based on the total weight of the cementitious basecoat formulation. The basecoat formulation, which includes the non-cementitious and cementitious basecoat formulations, may be applied with a total wet thickness of 0.7 to 25.4 mm. Application of the basecoat formulation may be as a single coat or as multiple coats.

The exterior finishing composition is also suitable as a topcoat formulation for application onto a basecoat. The topcoat formulation does not typically contain cement and may include from 5 to 65 weight % polymer, from 0.06 to 3.0 weight % rheology modifier, from 10 to 55 weight % water, from 0 to 30 weight % filler, and from 0 to 80 weight % aggregate. The topcoat formulation may be applied with a wet thickness in the range of 0.025 to 13 mm. In one embodiment, the topcoat is a clear finish which includes polymer, at least 0.1 weight % rheology modifier, and water but does not include filler, aggregate, cement, and pigment, and may be applied with a wet thickness in the range of 0.025 to 0.13 mm. A method of coating an exterior vertical surface with an exterior coating formulation which is a clear topcoat formulation includes the steps of applying onto an exterior vertical surface, the exterior finishing composition containing from 5 to 65 weight % polymer, wherein the polymer contains as polymerized units, from 20 to 100 parts by weight of the polymer of at least one $C_{12}$ to $C_{40}$ alkyl ester of (meth)acrylic acid, from 0 to 80 parts by weight of the polymer of at least one ethylenically unsaturated monomer, and from 0 to 10 parts by weight of the polymer of at least one ethylenically unsaturated acid containing monomer or salts thereof; from 0.1 to 3.0 weight % of at least one rheology modifier, based on weight of the exterior finishing composition; and from 30 to 55 weight % water, based on weight of the exterior finishing composition; and drying or allowing to dry the exterior finishing composition. In another embodiment, the topcoat formulation is opaque and includes from 2 to 30 weight % filler and from 20 to 80 weight % aggregate. The opaque topcoat formulation may include marble chips as an aggregate to provide a marble-like finish to the exterior surface.

The exterior finishing composition may be prepared by admixing the components using convention mixing methods known in the art, including paddle type mixers, high speed dispersators, and ribbon blenders. Rheology modifiers which are activated by the addition of base, such as alkali soluble emulsions and hydrophobically modified alkali soluble emulsions, are typically admixed with the other components of the exterior finishing composition at low pH and then base is added to adjust the pH.

The exterior finishing composition may be used in exterior and interior applications such as multilayered exterior wall systems including EIFS. Although the exterior finishing composition may be applied onto horizontal surfaces, it is especially suitable for application onto vertical surfaces where gravity may lead to sagging, dripping, or the formation of an uneven coating thickness of the applied exterior finishing composition. As used herein, vertical surfaces including surfaces standing perpendicular, sloped surfaces, and downward facing horizontal surfaces such as ceilings. Various methods may be used to apply the exterior finishing composition including troweling, spraying with air or airless hopper guns, brushing, rolling, and extruding. The preferred methods of application are troweling and spraying.

After application, the exterior finishing composition may dry or be allowed to dry by the loss of water from the exterior finishing composition. Suitable drying conditions include temperatures above 4° C. and humidity conditions below 100 % relative humidity. The drying rate increases as temperature increases and decreases as the relative humidity increases. The exterior finishing composition may be allowed to dry at ambient conditions or may be dried by the application of heat.

Test Methods

Dirt Pick-up Resistance (DPUR)

The DPUR test measures the ability of an exterior finishing composition to resist surface discoloration due to the accumulation of air and water borne dirt. The DPUR test method measures the amount of dirt which is permanently embedded into the surface of an exterior finishing composition after exposure to stimulated "dirt" in a laboratory environment.

Sample Preparation: The exterior finishing composition is applied with a thickness of 0.16 cm (1/16 inch) with a trowel onto an aluminum panel. The coated panel is allowed to dry for three days at a temperature of 25° C. and a relative humidity of 50%. Next, the coated panel is exposed to ultraviolet radiation in a QUV unit (The Q-Panel Company) for 24 hours. The coated panel is then removed from the QUV unit and allowed to equilibrate for 2 hours at a temperature of 25° C. and a relative humidity of 50%. The initial reflectance of the coated panel is measured using a Colorguard 45/0 Reflectometer (Gardner/Neotec Instrument Division, Silver Springs, Md.). The reported reflectance values are the average of three readings.

Preparation of Iron Oxide Slurry: Two drops of Tamol 731 dispersant (Tamol is a trademark of Rohm and Haas Company) is dissolved in 250 grams of water, followed by the addition of 125 grams of iron oxide. The mixture is dispersed with a Laboratory Dispersator (Premier Mill Corp.) until smooth.

Sample Testing: The iron oxide slurry is brushed onto one half of each coated panel. The coated panel is air dried for at least 2 hours or until the slurry is visually dry. Next, the coated panel is washed under running tepid water while rubbing lightly and evenly with a small amount of soap and a nylon scrub brush. The washed coated panel is dried for at least 2 hours at a temperature of 25° C. and a relative humidity of 50%. The reflectance of the slurry treated area of the washed coated panel is measured, taking the average of three readings. The % reflectance retained is calculated by:

% Reflectance Retained=100%×[Reflectance of Slurry Treated Area]/[Reflectance of Untreated Area].

The % reflectance retained is used to characterized the dirt pick-up resistance of the exterior finishing compositions. A high value for the % reflectance retained indicates good resistance to dirt pickup.

Wet Abrasion Resistance

The wet abrasion resistance measures the resistance of a exterior finishing composition to abrasion and provides a measure of early film formation.

Sample Preparation: The exterior finishing composition is applied with a wet thickness of 1.6 mm with a trowel onto a 16.5 cm×43.2 cm vinyl sheet. The coated sheet was dried at the specified temperature and relative humidity for 24 hours. After dry, uncoated vinyl from the edges of the sample are trimmed. The initial weight of the sample (A) is recorded to the nearest 0.01 gram.

Sample Testing: The coated sheet is taped onto an aluminum plate with the coated side up and placed on an abrasion tester (Gardener Straight Line Tester, Gardener Labs). An abrasive scrub medium (SC-2, the Leneta Company) is evenly applied onto the brush which was previously soaked in water for at least 12 hours. The brush is mounted onto the abrasion tester with the bristles touching the coated sheet. The abrasion tester is started and the number of cycles needed to remove the exterior finish composition from the vinyl sheet is recorded. After each 500 cycles before failure, 10 ml of water is added onto the coated sheet and 10 grams of abrasive scrub medium is placed on the bristles. If the coated sheet does not wear through, the test is stopped after 2000 cycles. The coated sheet is removed from the tested and rinsed under warm water. The coated sheet is dried for at least 12 hours at 25° C. and 50% relative humidity. After drying, the final weight of the coated sheet (B) is determined to the nearest 0.01 gram. Finally, the uncoated vinyl sheet is cut into three test strips with identical dimensions as the coated sheet and weighed to the nearest 0.01 gram. The weight of the uncoated vinyl sheet (C) is an average of these three weights. The % weight loss of the coated sheets which have not failed within 2000 cycles are determined according the following equation:

% Weight Loss=100%×[(A-B)/(A-C)].

A low value of % weight loss indicates good initial film formation and resistance to abrasion.

Washout Resistance

The washout resistance test measures the resistance of an exterior finishing composition to water spray. It is designed to simulate the effect of rain on the film formation of an exterior finishing composition at various drying conditions. The test consists of spraying water on sections of substrate coated with the exterior finishing composition.

Sample Preparation: The substrate is a 15.2 cm (6 inch) by 20.3 cm (8 inch) piece of expanded polystyrene board coated with a dried cementitious basecoat with embedded mesh. Tape is applied across the width of the substrate to divide the substrate into four sections. The exterior finishing composition is applied with a wet thickness of 1.6 mm with a trowel onto the exposed areas of the substrate and the tape is removed. Samples are dried for 24 hours at either standard conditions (25° C. and 50% relative humidity) and low temperature, high humidity conditions (4.4° C. and 80% relative humidity).

Sample Testing: The sample is placed at a 450 angle beneath a sprinkler nozzle and sprayed with water at a rate of 681 liters/hour (180 gallons/hour) for a period of 7 hours. Next the appearance of the sample is evaluated according to whether the exterior finishing coat was washed away, blistered, or was softened by the exposure to the water spray.

Water Blush Resistance

The water blush resistance test measures the whitening or blush of a exterior finishing composition when exposed to water. It also provides a relative measurement of the ability of the exterior finishing composition to recover if blushing does occur.

Sample Preparation: A 0.25 mm (10 mil) thick film of the polymer emulsion is cast onto a black vinyl substrate. The sample is dried at 25° C. and 50% relative humidity for two week. A second sample is dried in a vented oven at 50° C.

Test Procedure: The samples are equilibrated at 25° C. and 50% relative humidity for two hours prior to testing. A bead of water (approximately 1 cm in diameter) is placed on each film. The test consists of evaluating the appearances of the samples after various exposure times to the water bead. After 6 hours of exposure, the excess water is removed from the sample with an absorbent cloth and if blushing as occurred, the appearances are re-evaluated. The samples are rated on a scale of 1 to 10; a rating of 0 indicates no blushing has occurred while a rating of 10 indicates extremely heavy blushing.

EXAMPLE 1

Preparation of a Lauryl Methacrylate Containing Polymer

A 5-liter round bottom flask, with four necks, was equipped with a mechanical stirrer, a temperature control device, a condenser, a monomer feed line, and a nitrogen inlet. To the flask were introduced 1350 grams (g) deionized (D.I.) water and 24.2 g sodium lauryl sulfate (28% active). The contents of the flask were heated to 87° C., under a nitrogen purge. Next, 40.5 g of aqueous β-cyclodextrin (50% active) were introduced to the reactor, followed by the introduction of 5.0 g sodium carbonate dissolved in 10.0 g D.I. water. Next, 68 g of monomer emulsion listed in Table 1.1 below were introduced to the reactor. Two minutes later, 6.8 g of ammonium persulfate dissolved in 30 g of D.I. water were introduced to the reactor. After the exotherm peak, another 40.5 g of aqueous β-cyclodextrin (50% active) were introduced to the reactor. The monomer emulsion listed in Table 1.2 below was introduced to the reactor by gradual addition over 3 hours, while maintaining a reactor temperature of about 85° C. Following the completion of the feed, the reaction mixture was held at 85° C. for 15 minutes. After cooling to 55° C., 30.8 g of aqueous ammonia hydroxide (28% active) were added over 10 minutes. After cooling further to 45° C., a solution of 55.7 g of Triton X-405 (70% active, Union Carbide Corp.) dissolved in 71 g of D.I. water was added over 20 minutes. The reaction mixture was then stirred for 25 minutes. The pH of the mixture was adjusted to 9.5–10.0 with aqueous ammonium hydroxide (28% active) and the solids were adjusted to 47% with water.

TABLE 1.1

(all quantities in grams)

| Monomer Emulsion | |
|---|---|
| D.I. water | 19.3 |
| Sodium lauryl sulfate (28% active) | 0.84 |
| Lauryl methacrylate | 30.58 |
| Butyl methacrylate | 6.79 |
| Methyl methacrylate | 29.9 |
| Methacrylic Acid | 0.679 |

TABLE 1.2

(all quantities in grams)

| Monomer Emulsion | |
|---|---|
| D.I. water | 536.0 |
| Sodium lauryl sulfate (28% active) | 23.4 |
| Triton X-405 (70% active) | 81.0 |
| Lauryl methacrylate | 1266.6 |
| Methyl methacrylate | 595.5 |
| Methacrylic acid | 28.35 |

Comparative A

Preparation of a non-Lauryl Methacrylate Containing Polymer

A 5-liter round bottom flask, with four necks, was equipped with a mechanical stirrer, a temperature control device, a condenser, a monomer feed line, and a nitrogen inlet. To the flask were introduced 1350 grams (g) deionized (D.I.) water and 24.2 g sodium lauryl sulfate (28% active). The contents of the flask were heated to 87° C. under a nitrogen purge. Next, 93 g of monomer emulsion listed in Table 2.1 below were introduced to the reactor. Two minutes later, 6.8 g of ammonium persulfate dissolved in 30 g of D.I. water were introduced to the reactor. After the exotherm peak, the remainder of the monomer emulsion listed in Table 2.1 below was introduced to the reactor by gradual addition over 3 hours, while maintaining a reactor temperature of about 85° C. Following the completion of the feed, the reaction mixture was held at 85° C. for 15 minutes. After cooling to 55° C., 30.8 g of aqueous ammonia hydroxide (28% active) were added over 10 minutes. After cooling further to 45° C., a solution of 55.7 g of Triton X-405 (70% active, Union Carbide Corp.) dissolved in 71 g of D.I. water was added over 20 minutes. The reaction mixture was then stirred for 25 minutes. The pH of the mixture was adjusted to 9.5–10.0 with aqueous ammonium hydroxide (28% active) and the solids were adjusted to 47% with water.

TABLE A.1

(all quantities in grams)

| Monomer Emulsion | |
|---|---|
| D.I. water | 593.0 |
| Sodium lauryl sulfate (28% active) | 24.2 |
| Triton X-405 (70% active, Union Carbide Corp.) | 83.9 |
| Ethylene glycol | 19.5 |
| Butyl acrylate | 979.2 |
| Methyl methacrylate | 949.8 |
| Methacrylic acid | 29.5 |

EXAMPLE 2

Preparation of Exterior Finishing Composition

The exterior finishing compositions were prepared according to the formulation in Table 2. Materials were added in the order listed while mixing on a Hobart mixer at speed setting #1 and were mixed for 20 minutes after all ingredients were added. The viscosity of the coating was 103 Paste Units after equilibrating at room temperature for 24 hours.

TABLE 2

| Material | Weight (grams) |
| --- | --- |
| Polymer - Example 1 (47% weight solids) | 810.12 |
| Ethylene Glycol | 10.00 |
| Defoamer - Nopco NXZ | 4.00 |
| Titanium Dioxide - Ti-Pure R-942 slurry | 130.02 |
| Clay - Attagel 50 | 20.00 |
| Sand - Mystic White #15 | 300.04 |
| Sand - Mystic White #90 | 1700.24 |
| Copper Nitrate (8% solution) | 8.00 |
| Mildewcide - Skane M-8 | 4.00 |
| Coalescent - Texanol | 19.00 |
| Rheology Modifier - Acrysol ASE-60 | 12.00 |
| Water | 26.00 |
| Aqueous Ammonia (28%) | 26.00 |

Example 2, the exterior finishing composition in Table 2, had a pigment-volume concentration (PVC) of 69.7%.

Comparative B

Preparation of Exterior Finishing Composition with Non-Lauryl Methacrylate Containing Polymer Comparative B was prepared according to Example 2 with the polymer of Comparative A replacing the polymer of Example 1.

EXAMPLE 3

Application Testing—Dirt Pick-up Resistance

The exterior finishing compositions were tested for dirt pick-up resistance. The results are shown in Table 3.

TABLE 3

|  | Example 2 | Comparative B |
| --- | --- | --- |
| % Reflectance Retained | 47 | 39 |

The results in Table 3 demonstrate that Example 2, the exterior finishing composition of this invention, retained a higher percentage of its original reflectance and therefore has better dirt pick-up resistance than the exterior finishing composition prepared with the Comparative A polymer.

EXAMPLE 4

Wet Abrasion Resistance (Scrub Test)

The wet abrasion resistance of exterior finishing compositions Example 2 and Comparative B were tested according to the wet abrasion resistance test procedure. The results are listed in Table 4. The % weight loss was not measured for the samples which did not withstand 2000 cycles.

TABLE 4

|  | Example 2 | | Comparative B | |
| --- | --- | --- | --- | --- |
| Dry Condition | cycles | % weight loss | cycles | % weight loss |
| 25° C., 50% RH, 24 hrs. | 2000 | 1.2% | 2000 | 0.9% |
| 4.4° C., 80% RH, 24 hrs. | 2000 | 17.9% | 203 | n.m. |
| 4.4° C., 80% RH, 48 hrs. | 2000 | 13.5% | 608 | n.m. |

Note:
RH represents "relative humidity" and n.m. represent "not measured".

The data in Table 4 show that after dry at low temperature and high humidity conditions, Example 2 resisted 2000 scrubs while Comparative B was worn away prior to the completion of the test. This result indicates faster dry at low temperature, high humidity conditions for the exterior finishing composition of this invention than the exterior finishing composition prepared with the Comparative A polymer. At higher temperature and lower humidity drying conditions, Example 2 and Comparative B had similar dry properties.

EXAMPLE 5

Washout Resistance

The washout resistance of exterior finishing compositions Example 2 and Comparative B were tested according to the washout resistance test procedure. The results are listed in Table 5.

TABLE 5

| Dry Condition | Example 2 | Comparative B |
| --- | --- | --- |
| 25° C., 50% RH, 24 hrs. | excellent, no effect | excellent, no effect |
| 4.4° C., 80% RH, 24 hrs. | excellent, no effect | fair, soft |

After dry at low temperature and high humidity conditions, Example 2 had excellent resistance to water spray than Comparative B which was softened by exposure to the water spray. This result indicates faster dry at low temperature, high humidity conditions for the exterior finishing composition of this invention than the exterior finishing composition prepared with the Comparative A polymer.

EXAMPLE 6

Water Blush Resistance

The water blush resistance of exterior finishing compositions Example 2 and Comparative B were tested according to the water blush resistance test procedure. The results were rated according to a scale of 0 to 10 with 0 representing "no blush" and 10 representing "extremely heavy blush". The results are listed in Table 6.

TABLE 6

|  | Example 2 | | Comparative B | |
| --- | --- | --- | --- | --- |
|  | 25° C. | 50° C. | 25° C. | 50° C. |
| Exposure Time, hrs. | | | | |
| 0.5 | 0 | 0 | 0 | 0 |
| 1.0 | 0 | 0 | 1 | 0 |
| 2.5 | 0 | 0 | 2 | 3 |
| 4.0 | 0 | 0 | 5 | 3 |
| 6.0 | 1 | 1 | 7 | 6 |
| Recovery Time | | | | |
| 10 minutes | 0 | 0 | 5 | 5 |
| 16 hours | 0 | 0 | 0 | 0 |

The results in Table 6 demonstrate that Example 2, the exterior finishing composition of this invention, had better water blush resistance than the Comparative B exterior finishing composition. Also, Example 2 showed better recovery from blushing than Comparative B.

EXAMPLE 7

Evaluation of the Application Properties

The exterior finishing composition must have sufficient viscosity to be applied with a trowel, to prevent sagging after application onto a vertical surface, or to hold a textured pattern. These application properties were evaluated for the exterior finishing composition of Example 2 and for Comparative C, the exterior finishing composition of Example 2 prepared without rheology modifier.

The application of the exterior finishing composition by troweling typically involves first loading a mortar board with the exterior finishing composition, then scooping a portion of the exterior finishing composition from the mortar board, and lastly, applying the exterior finishing composition onto a vertical surface. To evaluate the troweling characteristics of the exterior finishing compositions, the exterior finishing composition was transferred to a flat horizontal mortar board with a spatula and the ability to load the exterior finishing composition onto mortar board was observed. Next a sample of the exterior finishing composition was removed from the mortar board with the trowel and the ability of the trowel to hold and to transfer the exterior finishing composition was recorded. The exterior finishing composition was applied onto a vertical surface of dried basecoat formulation with embedded scrim applied which was previously applied onto expanded polystyrene insulation board. The vertical surface was covered by moving the exterior finishing composition with the trowel to uniformly cover the surface. Finally after two minutes, a plastic trowel float was moved in a circular motion on the surface of the applied exterior finishing composition to impart a texture. Observations were made regarding the ability of the exterior finishing composition to hold the texture and to resist sagging.

TABLE 7.1

Application Characteristics of Exterior Finishing Composition Applied by Troweling

| | Example 2 | Comparative C |
|---|---|---|
| Loading Mortar Board | able to load and maintain sample on mortar board | flowed immediately and rapidly from mortar board; cannot load mortar board |
| Pickup onto Trowel | easy to pickup with trowel and transfer to vertical surface | difficult to pickup with trowel; flowed off trowel |
| Application on Vertical Surface and Texturing | did not sag after application; held texture pattern | immediate sagging; loss of texture pattern |

The results in Table 7.1 show that Example 2, the exterior finishing composition of this invention, which contains a rheology modifier, had suitable viscosity properties for trowel application, and was nonsagging and maintained a textured pattern after application onto a vertical surface. In comparison, Comparative C, the exterior finishing composition, which did not contain a rheology modifier, did not have the necessary application properties for trowel application and was unsuitable for application onto a vertical surface or for maintaining a textured pattern.

What is claimed:

1. An exterior finishing composition comprising:
   a) from 3 to 65 weight % based on weight of said exterior finishing composition of a polymer comprising as polymerized units:
      i) from 20 to 100 parts by weight of said polymer of at least one $C_{12}$ to $C_{40}$ alkyl ester of (meth)acrylic acid,
      ii) from 0 to 80 parts by weight of said polymer of at least one ethylenically unsaturated monomer, and
      iii) from 0 to 10 parts by weight of said polymer of at least one ethylenically unsaturated acid containing monomer or salts thereof;
   b) from 0.06 to 3.0 weight % of at least one rheology modifier, based on weight of said exterior finishing composition;
   c) from 10 to 55 weight % water, based on weight of said exterior finishing composition;
   d) from 0 to 30 weight % of at least one filler, based on weight of said exterior finishing composition; and
   e) from 0 to 80 weight % of at least one aggregate, based on weight of said exterior finishing composition;
   wherein said exterior finishing composition contains at least 2 weight % said filler and said aggregate, based on weight of said exterior finishing composition.

2. The exterior finishing composition according to claim 1 wherein the composition comprises:
   a) from 5 to 65 weight % said polymer, based on weight of said exterior finishing composition;
   b) from 0.06 to 3.0 weight % of at least one rheology modifier, based on weight of said exterior finishing composition;
   c) from 10 to 55 weight % water, based on weight of said exterior finishing composition;
   d) from 2 to 30 weight % of at least one filler, based on weight of said exterior finishing composition; and
   e) from 20 to 80 weight % of at least one aggregate, based on weight of said exterior finishing composition.

3. The exterior finishing composition according to claim 2 wherein said aggregate is selected from the group consisting of sand and marble chips.

4. The exterior finishing composition according to claim 1 wherein the composition comprises:
   a) from 5 to 10 weight % said polymer, based on weight of said exterior finishing composition;
   b) from 0.06 to 1.0 weight % of at least one rheology modifier, based on weight of said exterior finishing composition;
   c) from 10 to 20 weight % water, based on weight of said exterior finishing composition;
   d) from 10 to 25 weight % of at least one filler, based on weight of said exterior finishing composition;
   e) from 50 to 65 weight % of at least one aggregate, based on weight of said exterior finishing composition; and
   f) from 0 to 1.5 weight % of at least one pigment, based on weight of said exterior finishing composition.

5. The exterior finishing composition according to claim 1 comprising:
   a) from 3 to 10 weight % said polymer, based on weight of said exterior finishing composition;
   b) from 0.06 to 1.0 weight % of at least one rheology modifier, based on weight of said exterior finishing composition;
   c) from 10 to 30 weight % water, based on weight of said exterior finishing composition;
   d) from 0 to 5 weight % of at least one filler, based on weight of said exterior finishing composition;
   e) from 25 to 45 weight % of at least one aggregate, based on weight of said exterior finishing composition; and
   f) from 33 to 50 weight % cement, based on weight of said exterior finishing composition.

6. The exterior finishing composition of claim 1 wherein the filler is selected from the group consisting of clay, calcium carbonate, and titanium dioxide.

7. The finishing composition of claim 1 wherein said polymer is prepared by aqueous emulsion polymerization.

8. A method of coating an exterior vertical surface comprising:
   a) applying on said exterior vertical surface an exterior finishing composition comprising:
      1) from 3 to 65 weight % based on weight of said exterior finishing composition of a polymer comprising as polymerized units:
         i) from 20 to 100 parts by weight of said polymer of at least one $C_{12}$ to $C_{40}$ alkyl ester of (meth)acrylic acid,
         ii) from 0 to 80 parts by weight of said polymer of at least one ethylenically unsaturated monomer, and
         iii) from 0 to 10 parts by weight of said polymer of at least one ethylenically unsaturated acid containing monomer or salts thereof;
      2) from 0.06 to 3.0 weight % of at least one rheology modifier, based on weight of said exterior finishing composition;
      3) from 10 to 55 weight % water, based on weight of said exterior finishing composition;
      4) from 0 to 30 weight % of at least one filler, based on weight of said exterior finishing composition; and
      5) from 0 to 80 weight % of at least one aggregate, based on weight of said exterior finishing composition;
   wherein said exterior finishing composition contains at least 2 weight % said filler and said aggregate, based on weight of said exterior finishing composition; and
   b) drying or allowing to dry said exterior finishing composition.

9. The method of claim 8 wherein said polymer is prepared by aqueous emulsion polymerization.

* * * * *